United States Patent
Grimsrud et al.

(10) Patent No.: US 6,317,875 B1
(45) Date of Patent: Nov. 13, 2001

(54) APPLICATION EXECUTION PERFORMANCE THROUGH DISK BLOCK RELOCATION

(75) Inventors: Knut S. Grimsrud, Forest Grove; Richard L. Coulson, Portland, both of OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/231,132

(22) Filed: Jan. 15, 1999

(51) Int. Cl.[7] ........................................... G06F 9/45
(52) U.S. Cl. ........................ 717/9; 717/8; 711/112; 711/115
(58) Field of Search ..................... 717/9, 8; 711/165, 711/112, 100, 115, 163

(56) References Cited

U.S. PATENT DOCUMENTS

| | | | | |
|---|---|---|---|---|
| 5,630,093 | * | 5/1997 | Holzhammer et al. | 711/115 |
| 5,802,593 | * | 9/1998 | Grimsrud | 711/165 |
| 5,845,297 | * | 12/1998 | Grimsrud et al. | 707/205 |
| 5,890,205 | * | 3/1999 | Grimsrud et al. | 711/112 |
| 5,920,896 | * | 7/1999 | Grimsrud et al. | 711/165 |
| 5,987,479 | * | 11/1999 | Oliver | 707/205 |
| 6,023,713 | * | 2/2000 | Grimsrud et al. | 707/205 |
| 6,078,520 | * | 6/2000 | Tobita et al. | 365/185.09 |
| 6,092,163 | * | 7/2000 | Kyler et al. | 711/163 |
| 6,105,117 | * | 8/2000 | Ripley | 711/165 |
| 6,117,186 | * | 9/2000 | Wydall et al. | 717/9 |
| 6,182,079 | * | 1/2001 | Lenzie | 707/101 |
| 6,202,121 | * | 3/2001 | Walsh et al. | 711/100 |
| 6,240,527 | * | 5/2001 | Schneider et al. | 714/21 |

* cited by examiner

*Primary Examiner*—Mark R. Powell
*Assistant Examiner*—Chameli C. Das
(74) *Attorney, Agent, or Firm*—Blakely, Sokoloff, Taylor & Zafman LLP

(57) ABSTRACT

Execution time performance of one or more applications that are dynamically loaded for execution post initial loading is improved by invoking selected parts of the one or more applications for execution post initial loading to allow disk locations accessed and the order the disk locations are accessed to load the selected parts of the one or more applications for execution post initial loading to be traced, and in turn, based at least in part on the order the disk locations are accessed, alternate disk locations to be identified to store the selected parts of the one or more applications to reduce time required to load the selected parts of the one or more applications for execution post initial loading.

19 Claims, 5 Drawing Sheets

APPLICATION EXECUTION PERFORMANCE THROUGH DISK BLOCK RELOCATION

BACKGROUND OF THE INVENTION

1. Field of the Invention

The present invention relates to the field of computer systems. More specifically, the present invention relates to improving execution performance of applications.

2. Background Information

In the past decade, performance of microprocessor based computer systems have increased dramatically. In particular, the operating speed of microprocessors have increased from the meager 16 Mega Hertz (MHz) to well over 300 MHz. Correspondingly, while not as dramatic, performance of system and input/output (I/O) buses have also improved substantially, ensuring the microprocessors have adequate data with which to work with. However, except for the improvement provided by buffering etc., the performance of disk drives have lagged behind. As a result, users are often deprived of the full benefit of the increased performance supplied by the microprocessors.

In U.S. Pat. No. 5,123,456, a disk block allocation optimization methodology for generating an alternate disk block allocation based on the order a set of disk blocks are accessed, having particular application to improving an application or an operating system's start up or boot time, was disclosed. Employing the disclosed methodology, a user is able to perceive a difference in performance in an application/operating system's start up/boot time, between e.g. a system equipped with a 100 MHz microprocessor versus one equipped with a 200 MHz microprocessor.

Since then, microprocessor performance has continued to improve without abatement, allowing a user to execute a multitude of tasks of one or more applications concurrently. Once again, because of the performance constraints of disk drives, users are often deprived of the full benefit, even for systems endowed with the above mentioned disk block reallocation technology. Users of these systems are unable to perceive significant improvement in performance beyond application/operating system start up/boot time. Thus, further improvement to enable users to enjoy the full benefit of increased microprocessor performance is desired.

SUMMARY OF THE INVENTION

Selected parts of one or more applications that are loaded in the course of executing the one or more applications (post initial loading) are invoked to allow disk locations accessed and the order the disk locations are accessed to load the selected parts of the one or more applications for execution to be traced. In turn, based at least in part on the order the disk locations are accessed, alternate disk locations are identified, to store the selected parts of the one or more applications to reduce time required to load the selected parts of the one or more applications for execution post initial loading. As a result, execution performance of the one or more applications may be improved.

In one embodiment, the selected parts of the one or more applications are invoked by invoking selected functions or operations of the one or more applications post initial loading. In another embodiment, the selected parts of the one or more applications are invoked by selecting menu choices of the one or more applications post initial loading.

In one embodiment, the selective invocations of the selected parts of the one or more applications are performed by programming instructions of an installation utility or a post-installation function associated with the one or more applications. In an alternate embodiment, the selective invocations of the selected parts of the one or more applications are performed by programming instructions of an utility independent of the one or more applications.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well-known features are omitted or simplified in order not to obscure the present invention.

Parts of the description will be presented in terms of operations performed by a computer system, using terms such as data, flags, bits, values, characters, strings, numbers and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system; and the term computer system includes general purpose as well as special purpose data processing machines, systems, and the like, that are standalone, adjunct or embedded.

Various operations will be described as multiple discrete steps in turn in a manner that is most helpful in understanding the present invention, however, the order of description should not be construed as to imply that these operations are necessarily performed in the order of presentation, or even order dependent.

Figure 1:
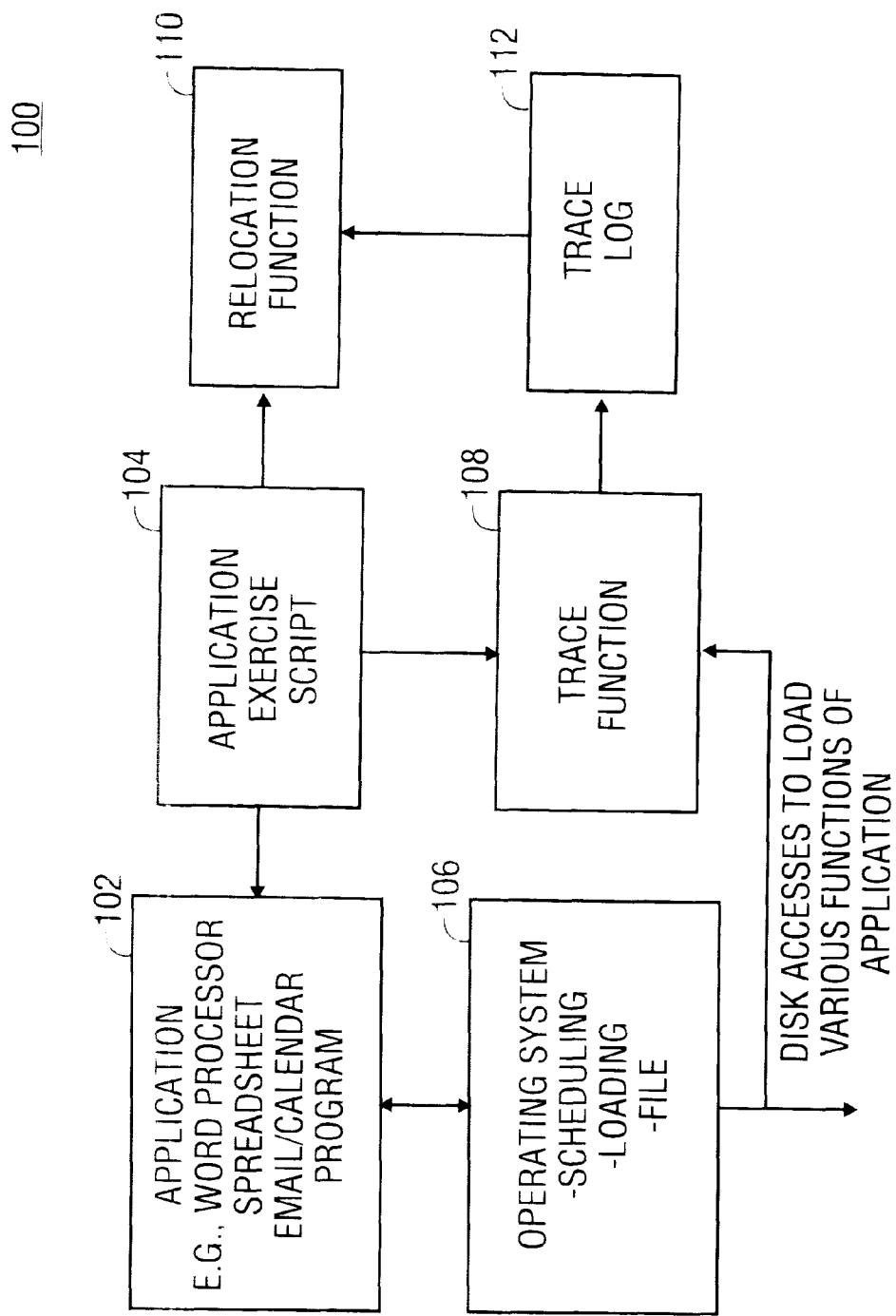
FIG. 1 is an overview illustration of the present invention.

Referring now to FIG. 1, wherein a block diagram illustrating an overview of the present invention in accordance with one embodiment is shown. As illustrated, in accordance with the present invention, application exercise script 104, exploiting the functions offered by trace function 108 and relocation function 110, causes the disk locations accessed and the order the disk locations are accessed to load selected parts of one or more applications 102 for execution post initial loading to be traced, and in turn, based at least in part on the order the disk locations are accessed, causes alternate disk locations to be identified, if possible, to store the selected parts of one or more applications 102 to reduce time required to load one or more applications 102 for execution. In accordance with the present invention, the selected parts of one or more applications 102 are the parts of applications 102 that are loaded in the course of execution post initial loading. As a result, upon relocating the selected parts of one or more applications 102 to the alternate disk locations, execution performance for one or more applications 102 is improved.

One or more applications 102 are intended to represent a broad range of individual or suites of applications known in the art, e.g. word processing, spreadsheet, email/calendar applications. Examples of selected parts of applications 102 that are loaded for execution post initial loading include alternate font sets, dictionary, thesaurus etc. of a word processing application. As illustrated, applications 102 utilize various services offered by operating system 106, including in particular, a loading service for accessing the different parts of applications 102 from a mass storage, such as a disk drive, to load the different parts into memory for execution. Operating system 106 is also intended to represent a broad range of operating systems known in the art, e.g. the Windows® family of operating systems available from Microsoft Corporation of Redmond, Wash. Accordingly, neither will be further described in detail below.

Trace function 108 performs the function of tracing disk accesses made by operating system 106 when loading the various parts of applications 102 for execution. As illustrated, the results of the tracings, including in particular, the order in which the disk locations are accessed, are stored in trace log 112. Relocation function 110 performs the function of identifying, if possible, alternate disk locations for the disk locations accessed to store the various parts of one or more applications 102 to reduce the time required to load them for execution. As alluded to earlier, the identification is performed based at least in part on the order the disk locations are accessed. For the illustrated embodiment, relocation function 110 also performs the actual relocation of the various parts of applications 102 from their original disk locations to the alternate disk locations, if they were identified. Trace function 108 and relocation function 110 are described in detail in the above identified U.S. Pat. No. 5,123,456, and U.S. patent application, No. 08/885,325, entitled "Disk Block Allocation Optimization Methodology And Applications", filed Jun. 30, 1997.

Figure 2:
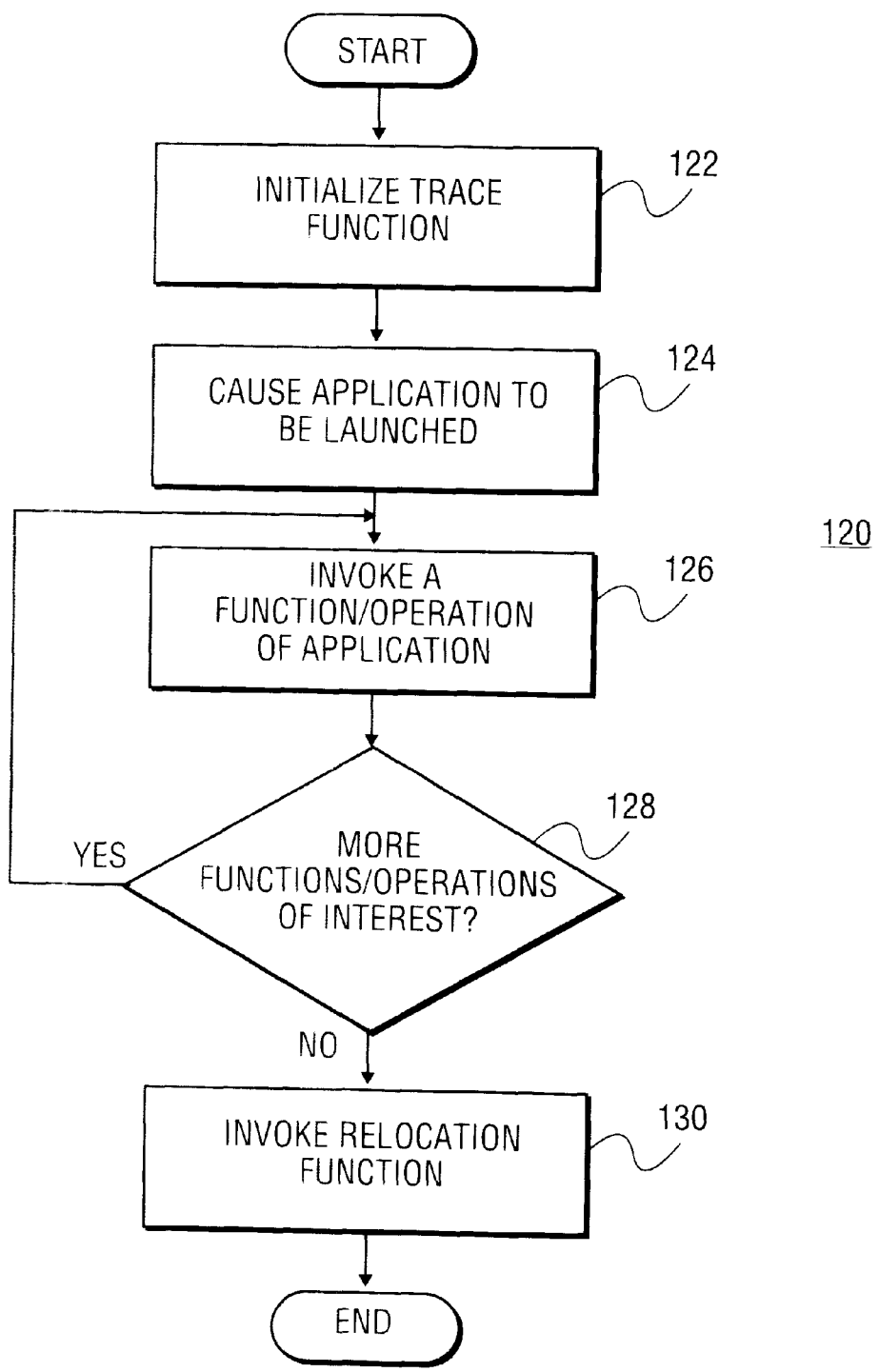
FIG. 2 is a flow chart illustrating the operational flow of the application exercise script of FIG. 1 in accordance with one embodiment.

FIG. 2 illustrates the operational flow of application exercise script 104 in accordance with one embodiment of the present invention. As illustrated, at 122, script 104 initializes trace function 108 to perform the tracing. In one embodiment, script 104 identifies applications 102 to trace function 108, which in turn registers its interest in applications 102 with operating system 106, thereby allowing trace function 108 to be informed of all disk accessing activities associated with loading the different parts of applications 102. At 124, upon initializing trace function 108, script 104 causes applications 102 to be launched. Thereafter, i.e. post initial loading, at 126, script 104 invokes a function or an operation of applications 102. For the illustrated embodiment, script 104 repeats 126 in a predetermined manner, systematically invoking different functions or operations of applications 102. As a result, disk accesses performed by operating system 106 to load the different parts of applications 102 for execution post initial loading may be learned by trace function 108, and recorded into trace log 112, including in particular, the order the various disk locations are accessed. In one embodiment, the functions or operations of applications 102 to be invoked post-initial loading are predetermined by the vendor(s) of applications 102. In an alternate embodiment, it is anticipated that script 104 may employ a number of heuristic factors, or involve a user in customizing the functions of applications 102 to be invoked post initial loading. In one embodiment, the invocation of the various functions of applications 102 are effectuated by systematically selecting corresponding menu choices of applications 102 post installation loading. The number and exact nature of the menu choices systematically selected are application dependent. [Note that the various employment of the phrase "in one embodiment" do not necessarily refer to the same embodiment.]

Having systematically caused the various desired functions of applications 102 to be invoked and loaded for execution post initial loading, thereby allowing the disk locations accessed and the order they are accessed to be traced, at 130, script 104 invokes relocation function 110 to attempt to identify, based at least in part on the order the disk locations are accessed, an alternate set of disk block allocation for use to store the different parts of applications 102 to reduce the time required to load these different parts of applications 102 for execution. As described earlier, if relocation function 130 is able to identify an alternate set of disk block allocation that will yield a reduction in access time, relocation function 110 further relocates the different parts of applications 102 to the alternate disk locations. The relocation may be effectuated in any one of a number of move techniques known in the art, including but not limited to the one disclosed in U.S. patent application, No. 08/885, 327, entitled "Source Oriented Data Block Relocation Methodology And Applications", filed Jun. 30, 1997.

Figure 3A:
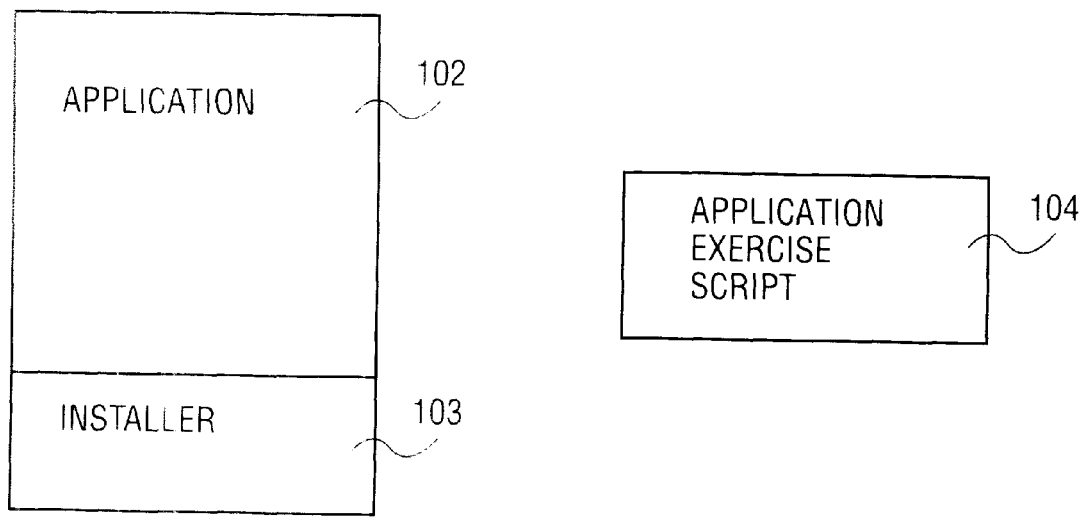
FIGS. 3a–3b illustrate the manner in which the application exercise script of FIG. 1 may be packaged in accordance with two embodiments.
Figure 3B:
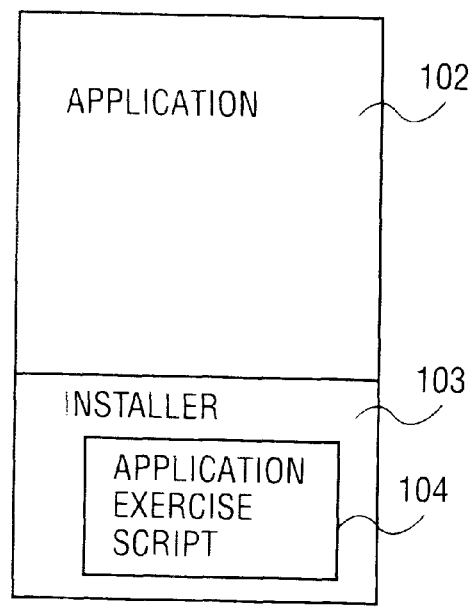

FIGS. 3a–3b illustrate the manner in which applications 102 and script 104 may be packaged in accordance with two embodiments of the present invention. For the embodiment illustrated in FIG. 3a, script 104 is independently packaged having no association with applications 102. For example, script 104 may be packaged as an integral part of an independent utility. Thus, the present invention is practiced post-installation of applications 102. However, for the embodiment illustrated in FIG. 3b, script 104 is integrally packaged with installation utility 103 of applications 102. Thus, the present invention may be practiced as an integral part of the installation process for applications 102. In alternate embodiments, script 104 may be packaged with a post-installation function of applications 102, thus allowing the present invention to be automatically practiced post-installation of applications 102.

Figure 4A:
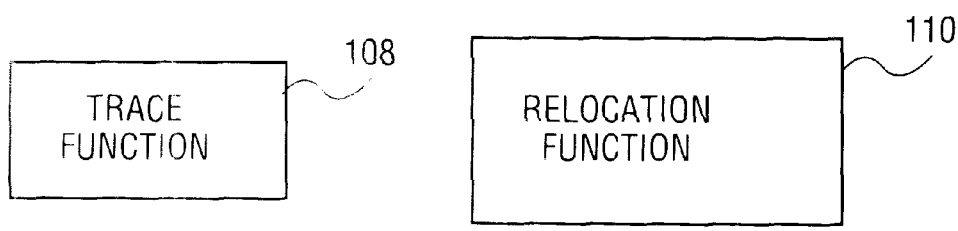
FIGS. 4a–4b illustrate the manner in which the trace and relocation functions of FIG. 1 may be packaged in accordance with two embodiments.
Figure 4B:
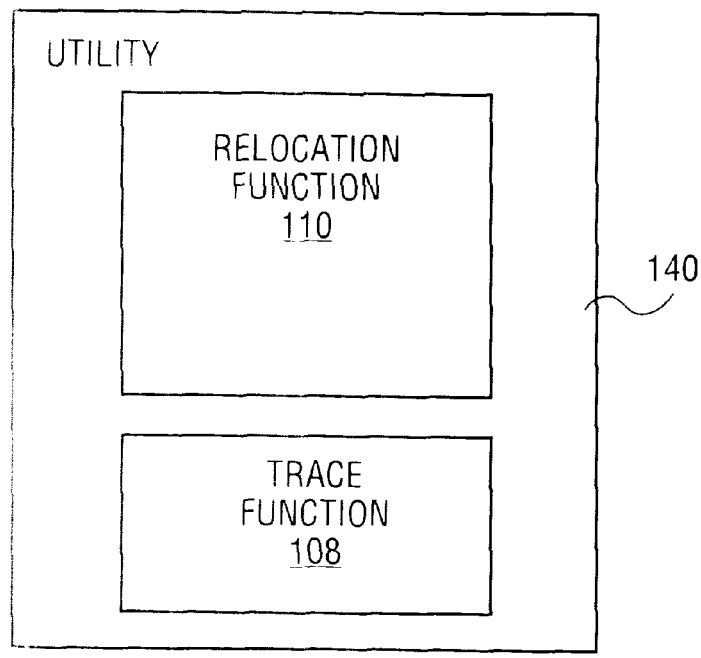

FIGS. 4a–4b illustrate the manner in which trace function 108 and relocation function 110 may be packaged in accordance with two embodiments of the present invention. For the embodiment illustrated in FIG. 4a, trace function 108 and relocation function 110 are separately packaged. However, for the embodiment illustrated in FIG. 4b, trace function 108 and relocation function 110 are integrally packaged as parts of stand alone utility 140 independent of applications 102. In alternate embodiments, trace and relocation functions 108 and 110 may be packaged in other manners also.

Figure 5:
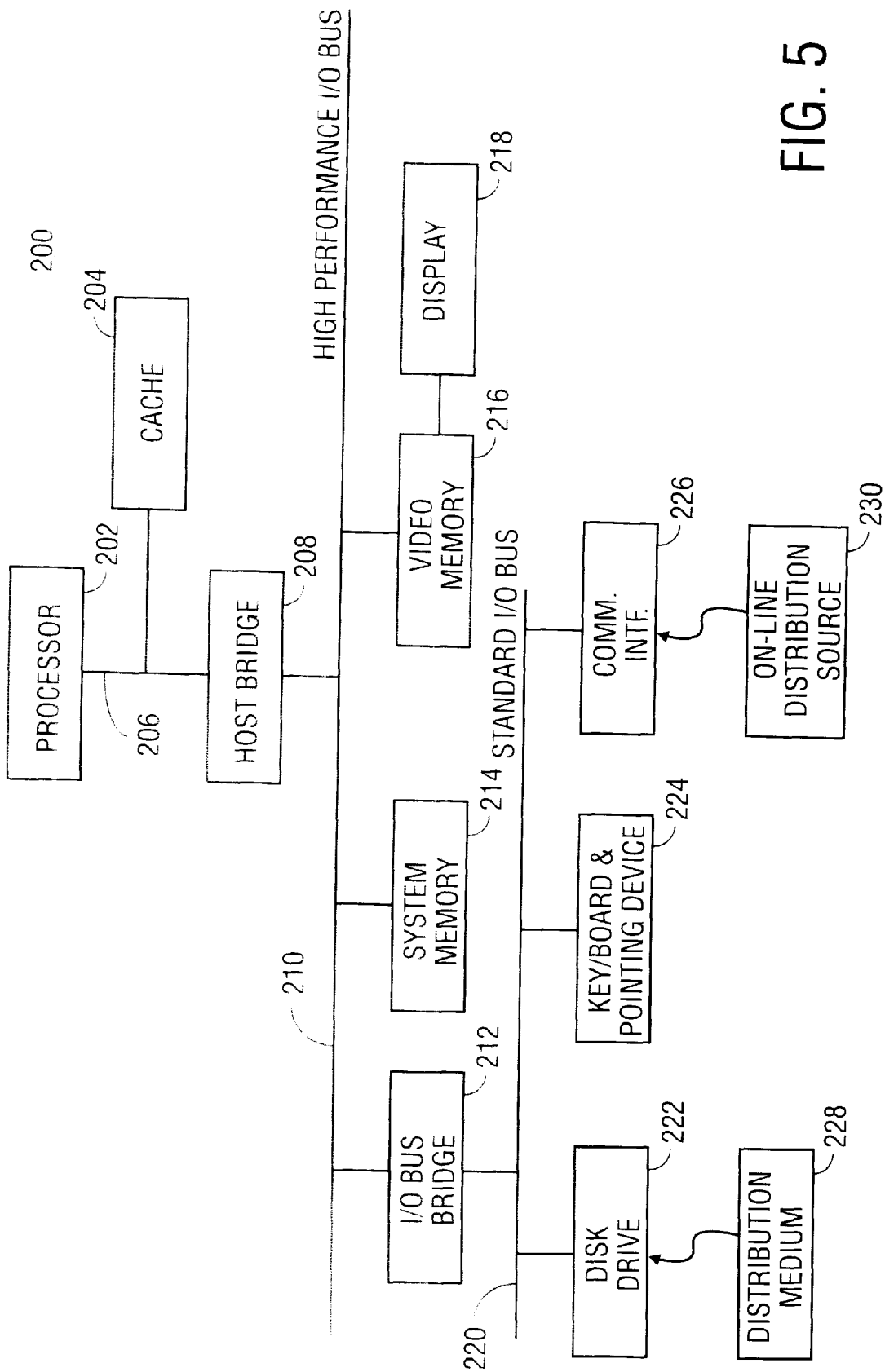
FIG. 5 illustrates an example computer system suitable for practicing the present invention in accordance with one embodiment.

FIG. 5 illustrates an example computer system suitable for practicing the present invention in accordance with one embodiment. As shown, for the illustrated embodiment, computer system 200 includes processor 202, processor bus 206, high performance I/O bus 210 and standard I/O bus 220. Processor bus 206 and high performance I/O bus 210 are bridged by host bridge 208, whereas I/O buses 210 and 212 are bridged by I/O bus bridge 212. Coupled to processor bus 206 is cache 204. Coupled to high performance I/O bus 210 are system memory 214 and video memory 216, against which video display 218 is coupled. Coupled to standard I/O bus 220 are disk drive 222, keyboard and pointing device 224 and communication interface 226.

These elements perform their conventional functions known in the art. In particular, disk drive 222 and system memory 214 are used to store a permanent and a working copy of the programming instructions for effectuating the teachings of the present invention, when executed by processor 202. The permanent copy may be pre-loaded into disk drive 222 in a factory, loaded from distribution medium 228, or down loaded from on-line distribution source 230. Disk drive 222 and system memory 214 may also be used to store similar copies of applications 102, operating system 106, trace function 108 and relocation function 110. The constitutions of these elements are known. Any one of a number of implementations of these elements known in the art may be used to form computer system 200.

While the method and apparatus of the present invention have been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

Thus, a method and apparatus for improving application execution performance has been described.

What is claimed is:

1. A method comprising:
   (a) causing various parts of one or more applications that are dynamically loaded during execution post initial loading to be loaded for execution to allow disk locations employed to store the various parts of the one or more applications and the order the disk locations are accessed to load the various parts of the one or more applications for execution post initial loading to be traced by a first function;
   (b) invoking a second function to identify alternate disk locations to store the selected parts of the one or more applications, to improve time required to load the various parts of the one or more applications for execution post initial loading, the alternate disk locations being identified by the second function based at least in part on the order the disk locations are accessed.

2. The method of claim 1, wherein said causing of the various parts of the one or more applications that are dynamically loaded during execution post initial loading to be loaded for execution comprises invoking selected functions or operations of the one or more applications post initial loading.

3. The method of claim 1, wherein said causing of the various parts of the one or more applications that are dynamically loaded during execution post initial loading to be loaded for execution comprises selecting various menu choices of the one or more applications post initial loading.

4. The method of claim 1, wherein said method further comprises initializing said first function to perform said tracing of said disk location accessed to load the selected parts of the one or more applications for execution post initial loading.

5. The method of claim 1, wherein said method further comprises relocating the selected parts of the one or more applications to the alternate disk locations.

6. An apparatus comprising:
   (a) a storage medium having stored therein a first plurality of programming instructions; and
   (b) an execution unit coupled to the storage medium to execute the first plurality of programming instructions to cause various parts of one or more applications that are dynamically loaded during execution post initial loading to be loaded for execution to allow disk locations employed to store the various parts of the one or more applications and the order the disk locations are accessed to load the various parts of the one or more applications for execution post initial loading to be traced, and in turn, based at least in part on the order the disk locations are accessed, alternate disk locations to be identified to store the selected parts of the one or more applications, to improve time required to load the various parts of the one or more applications for execution post initial loading.

7. The apparatus of claim 6, wherein the first plurality of programming instructions when executed by the execution unit invoke selected functions or operations of the one or more applications after the one or more applications have been initially loaded.

8. The apparatus of claim 6, wherein the first plurality of programming instructions when executed by the execution unit select various menu choices of the one or more applications after the one or more applications have been initially loaded.

9. The apparatus of claim 6, wherein the first plurality of programming instructions are part of a selected one of an installation utility and a post-installation function associated with the one or more applications.

10. The apparatus of claim 6, wherein the first plurality of programming instructions are part of an utility independent of the one or more applications.

11. The apparatus of claim 6, wherein said tracings are performed by a second plurality of programming instructions which are also stored on said storage medium and executed by the execution unit, and the second plurality of programming instructions are part of an utility independent of the one or more applications.

12. The apparatus of claim 6, wherein said identification of alternate disk locations are performed by a second plurality of programming instructions which are also stored on said storage medium and executed by the execution unit, and the second plurality of programming instructions are part of an utility independent of the one or more applications.

13. An article of manufacture comprising:
   a recordable medium having recorded thereon a first plurality of programming instructions for use to program an apparatus to enable the apparatus, by executing the first plurality of programming instructions, to cause various parts of one or more applications that are dynamically loaded during execution post initial loading to be loaded for execution to allow disk locations employed to store the various parts of the one or more applications and the order the disk locations are accessed to load the various parts of the one or more applications for execution post initial loading to be traced, and in turn, based at least in part on the order the disk locations are accessed, alternate disk locations to be identified, if possible, to store the selected parts of the one or more applications, to improve time required to load the various parts of the one or more applications for execution post initial loading.

14. The article of manufacture of claim 13, wherein the first plurality of programming instructions enable the programmed apparatus to invoke selected functions or operations of the one or more applications post initial loading.

15. The article of manufacture of claim 13, wherein the first plurality of programming instructions enable the programmed apparatus to select various menu choices of the one or more applications post initial loading.

16. The article of manufacture of claim 13, wherein the recordable medium is further recorded with the one or more applications including a selected one of an installation utility and a post-installation function of the one or more applications for use to program the apparatus with the one or more applications, and the first plurality of programming instructions are part of the selected one of said installation utility and said post-installation function of the one or more applications.

17. The article of manufacture of claim 13, wherein the first plurality of programming instructions are part of an utility independent of the one or more applications.

18. The article of manufacture of claim 13, wherein said recordable medium is further recorded with a second plurality of programming instructions to perform said tracings of disk location accessed and the order the disk locations are accessed.

19. The article of manufacture of claim 13, wherein said recordable medium is further recorded with a second plurality of programming instructions to perform said identification of alternate disk locations.

\* \* \* \* \*